Figure 4:
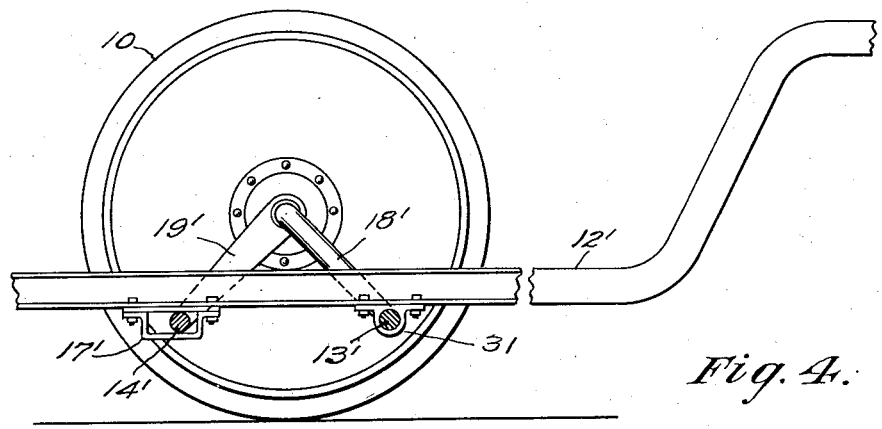

March 30, 1926.  1,578,705
S. G. BARNARD
RUNNING GEAR FOR VEHICLES
Filed Jan. 16, 1924  2 Sheets-Sheet 1
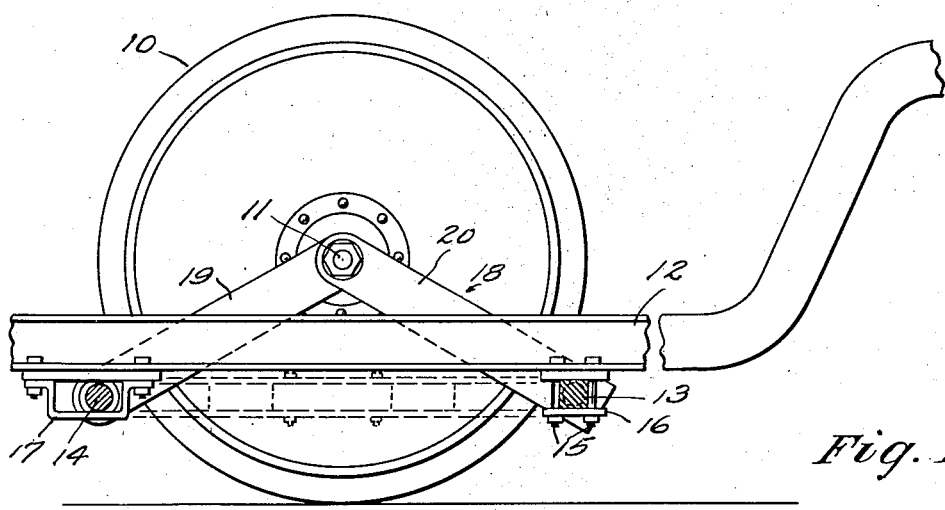
Fig. 1.
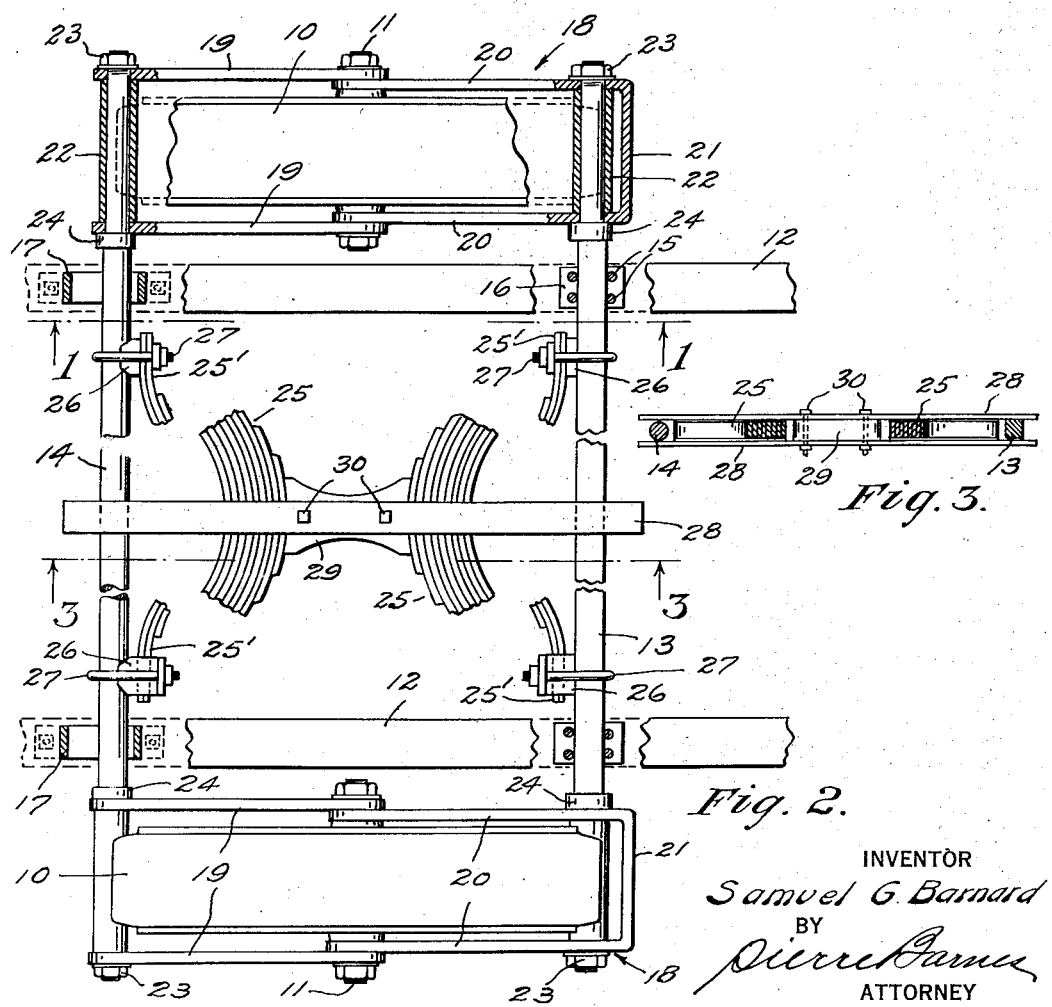
Fig. 2.
Fig. 3.
INVENTOR
Samuel G. Barnard
BY
Pierre Barnes
ATTORNEY March 30, 1926.

S. G. BARNARD 1,578,705

RUNNING GEAR FOR VEHICLES

Filed Jan. 16, 1924        2 Sheets-Sheet 2

INVENTOR
Samuel G. Barnard
BY
Pierre Barnes
ATTORNEY

Patented Mar. 30, 1926.

1,578,705

UNITED STATES PATENT OFFICE.

SAMUEL G. BARNARD, OF SEATTLE, WASHINGTON.

RUNNING GEAR FOR VEHICLES.

Application filed January 16, 1924. Serial No. 686,536.

*To all whom it may concern:*

Be it known that I, SAMUEL G. BARNARD, a citizen of the United States, residing at Seattle, in the county of King and State of Washington, have invented certain new and useful Improvements in Running Gears for Vehicles, of which the following is a specification.

This invention relates to the running gear of vehicles and, more particularly, to the axles and the manner or means of suspending the vehicle body.

The object of the invention is the perfecting of devices of this character to afford a relatively low vehicle body and means to overcome the effects of road shocks and vibrations occurring in the vehicle when traveling.

With these and other ends in view, the invention consists in the novel construction, adaptation and combination of parts hereinafter described and claimed.

In the accompanying drawings, where similar reference numerals indicate corresponding parts in all of the views,—

Figures 5, 6:
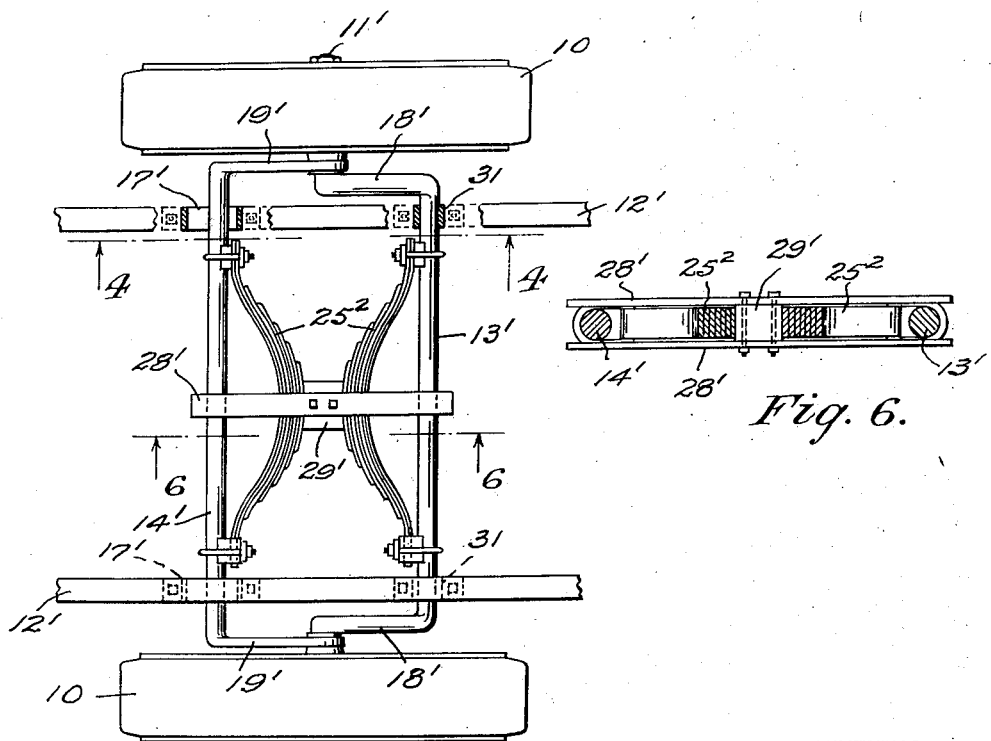

Figure 1 is a longitudinal vertical section taken on line 1—1 of Fig. 2 of a portion of a vehicle embodying my invention; Fig. 2 is a sectional plan view, partly broken away of the same; and Fig. 3 is a longitudinal sectional view on line 3—3 of Fig. 2. Fig. 4 is a longitudinal vertical section on line 4—4 of Fig. 5 illustrating a modified construction of my invention applied to a part of a vehicle; Fig. 5 is a sectional plan view of Fig. 4; and Fig. 6 is a longitudinal section on line 6—6 of Fig 5.

Referring to the construction now preferred by me, illustrated in Figs. 1 to 3, inclusive, the numeral 10 represent vehicle wheels which are journaled on spindles 11, and 12 represents side frame members upon which is mounted the vehicle body, not shown.

Said frame members are supported upon transversely arranged bars 13 and 14 at the front and rear, respectively, of said wheels.

One of said bars, preferably the front one 13, is rigidly secured as by means of bolts 15 and stirrup plates 16 to the longitudinal members 12 and constitute a part of the vehicle frame.

The other bar, 14, is connected for relative longitudinal sliding movements to the respective frame members 12 as by means of guide brackets 17, depending therefrom. The outer ends of said transverse bars 13 and 14 are pivotally connected to the lower ends of hangers 18 and 19 whose other ends are pivotally connected to the spindle 11. As shown, each of the hangers 18 for the forward bar 13 is of a substantially U-shape comprising a transverse element 21 integral with arms 20 one at each side of the associated wheel. The hangers 19 for the rear bar consist preferably of companion links for each wheel and disposed at opposite sides of the same.

22 represents sleeves mounted upon the bar ends intermediate the companion links of the rear hangers, and between the arm elements 20 of the forward hangers. The several hangers are detachably connected to the respective bars by means of nuts 23 engaging said bars and coacting with bar collars 24 for maintaining the hangers in spaced relation corresponding to the positions of the wheels. Interposed between the bars 13 and 14 are springs 25, herein illustrated as laminated carriage springs which have their ends $25^1$ engaged with blocks 26 which are secured to the respective bars as by means of clevises 27.

Intermediate their lengths the springs 25 are supported and retained in operative positions by means of vertically spaced plates or rods 28 disposed above and below the springs and bars, as shown in Fig. 3.

29 represents a bolster positioned between the springs and is advantageously secured as by bolts 30 to the rods 28, which rods, subject to the springs 25, are movable at right angles with respect to the rods.

The weight of the vehicle body acting against the bars 13 and 14 tend to bear the latter downwardly. Subject to the action of the hangers 18 and 19, however, the bars 13 and 14 are constrained to move in arcs concentric to the axis of the wheel spindles 11 and in opposition to the power of the springs 25. When the vehicle is in motion the springs act resiliently to overcome or neutralize jars or road shocks of the vehicle with respect to its load.

In the modified forms of the invention, hangers $18^1$ are formed integral with and arranged at right angles to the respective wheel spindles $11^1$ and the transverse bar $13^1$.

The bar $13^1$ is pivotally connected by means of bearing boxes 31 to the side frame members 12¹. The other bar 14¹ is provided at each of its ends with arms 19¹ which are apertured to receive the respective spindles 11¹ to make a swinging connection thereto for the bar 14¹. The bar 14¹, like the bar 14 of the preferred form above described, is connected for relatively sliding movements to the side frame members 12¹ by means of guide brackets 17¹.

Springs 25² and a spacing bolster 29¹ are also employed between the transverse bars 13¹ and 14¹ and are supported by rod elements 28¹ engaging said bars as shown in Figs. 5 and 6.

While I have illustrated the invention as applied to the rear wheels of a vehicle it is to be understood that my improved devices may also be used in association with the front wheels of a vehicle.

What I claim, is,—

1. In a vehicle, the combination with the vehicle wheels, the axle spindles therefor, and the frame members, of transversely arranged bars connected for relative longitudinal movements to said frame members, hanger members connecting both of said bars with the spindles of said wheels for movement concentric to the axis of the latter, and springs located between said bars acting through the medium of the latter for yieldingly holding the lower ends of the hangers of one bar in spaced apart relations with respect to the hangers of the other bar.

2. In a vehicle, the combination with the vehicle wheels, the axle spindles therefor, and the vehicle-body frame, of two pairs of hangers pivotally connected to said spindles, one of said pairs of hangers being connected to the frame in front of the spindles and the other pair of hangers being connected to the frame to the rear of the spindles and for relative longitudinal movements with respect to the first named pair of hangers, and springs acting to yieldingly hold said pairs of hangers in their outermost positions with respect to each other and in opposition to the weight of the frame which tends to keep the hangers in their innermost positions.

3. In a vehicle, the combination with the vehicle wheels, the axle spindles therefor and a vehicle frame, of a transversely arranged bar secured to said frame, a second transversely arranged bar connected to said frame for relative longitudinal motion, hangers pivotally connected to said spindles and to the respective bars, and spring devices acting against the second named bar and tending to retain the same at its outermost position with respect to said frame.

Signed at Seattle, Washington, this 22nd day of December 1923.

SAMUEL G. BARNARD.